(12) United States Patent
Burchill

(10) Patent No.: US 9,786,196 B2
(45) Date of Patent: Oct. 10, 2017

(54) TRAINING APPARATUS AND METHOD

(71) Applicant: Cain 176 Corp., Braintree, MA (US)

(72) Inventor: Kevin M. Burchill, Braintree, MA (US)

(73) Assignee: Cain 176 Corp. MA (US)

( * ) Notice: Subject to any disclaimer, the term of this patent is extended or adjusted under 35 U.S.C. 154(b) by 262 days.

(21) Appl. No.: 14/689,208

(22) Filed: Apr. 17, 2015

(65) Prior Publication Data
US 2015/0302768 A1  Oct. 22, 2015

Related U.S. Application Data

(60) Provisional application No. 61/980,947, filed on Apr. 17, 2014.

(51) Int. Cl.
| | | |
|---|---|---|
| *A63B 69/00* | (2006.01) | |
| *G09B 19/00* | (2006.01) | |
| *G09B 5/02* | (2006.01) | |
| *G09B 9/00* | (2006.01) | |

(52) U.S. Cl.
CPC .......... *G09B 19/0038* (2013.01); *G09B 5/02* (2013.01); *G09B 9/00* (2013.01)

(58) Field of Classification Search
USPC .............. 434/77, 247, 251, 252, 255, 402; 273/108.1, 108.5; 473/446
See application file for complete search history.

(56) References Cited

U.S. PATENT DOCUMENTS

| | | | | |
|---|---|---|---|---|
| 3,709,489 A | * | 1/1973 | Holleran | A63B 69/00 273/127 B |
| 3,712,628 A | * | 1/1973 | Boss, Jr. | A63B 69/3661 473/279 |
| 3,731,917 A | | 5/1973 | Townsend | |
| 3,765,675 A | * | 10/1973 | DiMarzio | A63B 63/06 273/126 A |
| 3,955,815 A | | 5/1976 | Deschesnes | |
| 4,607,842 A | * | 8/1986 | Daoust | A63B 24/0021 124/51.1 |
| 4,611,809 A | * | 9/1986 | Gettelfinger | A63B 67/02 273/123 A |
| 4,700,952 A | * | 10/1987 | Patsy | A63B 63/06 273/406 |
| 5,249,797 A | | 10/1993 | Dowhy | |
| 5,417,421 A | * | 5/1995 | Bagley | A63F 7/0668 273/108.5 |

(Continued)

*Primary Examiner* — Kurt Fernstrom
(74) *Attorney, Agent, or Firm* — Dicke, Billig, Czaja, PLLC

(57) ABSTRACT

A training apparatus is generally provided. The apparatus generally includes a user platform for support of a user in furtherance of select manipulation of a workpiece, and a deck assembly adjacent the user platform. The deck assembly is characterized by a frame, an endless belt interior of the frame, and a drive assembly, portions of which are operatively supporting the endless belt for select travel in relation to the frame. The endless belt has a user visible surface bearing indicia about which the work piece is to be traversed by a platform supported user during travel of the endless belt in relation to the frame. The drive assembly includes a controller for control of either or both of the endless belt travel direction in relation to the frame and the endless belt travel rate in relation to the frame.

22 Claims, 4 Drawing Sheets

(56) References Cited

U.S. PATENT DOCUMENTS

| | | | |
|---|---|---|---|
| 5,509,652 A * | 4/1996 | Woronets | A63B 69/36 |
| | | | 473/446 |
| 5,660,550 A * | 8/1997 | Roche | A63B 22/02 |
| | | | 473/427 |
| 5,707,304 A | 1/1998 | BelleIsle | |
| 5,769,742 A | 6/1998 | Bristow | |
| 6,364,790 B1 * | 4/2002 | Carrie | A63B 69/00 |
| | | | 473/278 |
| 6,457,711 B1 * | 10/2002 | Baulesh | A63B 67/002 |
| | | | 273/108.1 |
| 6,656,064 B2 * | 12/2003 | Zielinski | A63B 69/0024 |
| | | | 273/118 R |
| 6,846,252 B2 * | 1/2005 | Nudo | A63B 47/002 |
| | | | 473/278 |
| 6,966,853 B1 * | 11/2005 | Wilkerson | A63B 47/002 |
| | | | 473/421 |
| 7,104,901 B1 * | 9/2006 | Mason | A63B 5/16 |
| | | | 473/446 |
| 7,166,045 B1 | 1/2007 | Linner et al. | |
| 7,896,781 B2 * | 3/2011 | Larson | A63B 22/203 |
| | | | 482/54 |
| 8,944,967 B2 | 2/2015 | Kramer et al. | |
| 2005/0079933 A1 | 4/2005 | Cagne | |

* cited by examiner

TRAINING APPARATUS AND METHOD

This is a United States national patent application filed pursuant to 35 USC §111(a) claiming priority under 35 USC §120 of/to U.S. Pat. Appl. Ser. No. 61/980,947 filed Apr. 17, 2014 and entitled STICK HANDLING APPARATUS & METHOD, the disclosure of which is hereby incorporated by reference in its entirety.

TECHNICAL FIELD

The present disclosure, provided pursuant to 35 USC §111(b) and 37 CFR §1.53(c), generally relates to athletic training and skill development, more particularly, to a training apparatus and method for improving stick handling and the like.

BACKGROUND

Athletic pursuits require a unique blend of brains and brawn, and almost always, a heavy dose of skill. For as long as there have been athletic contests, there have no doubt been training aids; they're as old as time immemorium. Moreover, with childhood seasonal sports having evolved into year round, non-stop seasons with multiple teams per player per sport, all involved are seeking and valuing a performance edge.

With regard to hockey, essential elements or skills of the sport comprise skating and stick handling. Clearly, on-ice training for each skill is not only advantageous, but necessary. Be that as it may, stick handling training and skill development is well suited for off-ice pursuit.

While a variety of stick handling training gadgets and methods abound, few, if any, simulate game play and the on-ice experience. Moreover, while most if not all contemplate lateral movements, few simulate meaningful back and forth or fore and aft action without resorting to actual player motion in either such direction. Further still, few stick handling training devices are readily adapted, altered, etc. to increasingly challenge a user in furtherance of skill enhancement. Thus, it is believed advantageous to provide a stick handling training apparatus which aids in the development and enhancement of non-skating skills while simulating fore and aft game/rink travel. More particularly, it is believed both desirable and advantageous to provide a training apparatus characterized by a stick handling deck having a traveling surface upon which a user, separate and apart from the deck, manipulates a work piece such as a puck or ball, and which may be selectively adapted and/or controlled for increased or graduated skill development. In-as-much as stick handling training has been/is presented in relation to ice hockey, it need not be so limited, with field hockey being another or further contemplated game or sport. The training sought for improvement need only contemplate or require a stick or other tool/implement which is used to direct a work piece upon a surface.

SUMMARY OF THE INVENTION

A training apparatus is generally provided. The training apparatus includes a deck assembly characterized by a frame, an endless belt interior of the frame, and a drive assembly, portions of which operatively support the endless belt for select travel relative to the frame, the endless belt for solely supporting a work piece thereupon. The endless belt has a user visible surface bearing indicia about which the supported work piece is to be maneuvered or traversed by a user positioned in proximity to the frame, more particularly the endless belt, during travel of the endless belt in relation to the frame. The drive assembly includes a controller for control of either or both of the endless belt travel direction relative to the frame and the endless belt travel rate in relation to the frame.

The apparatus may be further characterized by a user platform, adjacent the deck assembly, for support of a user in furtherance of select manipulation of a workpiece. The user platform may be adjacent either side of the deck assembly, or adjacent an end portion of the deck assembly.

The apparatus may be yet further characterized by an upstanding structure, e.g., a "target," adjacent an end portion of the deck assembly, advantageously, opposite a user platform, i.e., the deck assembly is operatively intermediate the user platform and the target.

The frame of the deck assembly may be equipped with curbing which "frames" the endless belt on three sides, namely, both lateral sides and one end or longitudinal side. Moreover, the frame of the deck assembly may be further or alternately and selectively equipped with sidewalls which further and more robustly frame the work piece deck on opposing sides.

The indicia of the visible surface of the endless belt generally includes indicia sets. Advantageously, but not necessarily, each set of the indicia sets are characterized by select unique indicia spacings throughout a length and width of the endless belt. Moreover, each set of the indicia sets correlate to a unique degree of difficulty for work piece manipulation relative to the endless belt. More specific features and advantages obtained in view of those features will become apparent with reference to the drawing figures and DETAILED DESCRIPTION OF THE INVENTION.

BRIEF DESCRIPTION OF THE DRAWINGS

The apparatus, assemblies, subassemblies, structures and/or elements disclosed directly or implicitly herein may be embodied in other specific forms without departing from the spirit or general characteristics thereof, some of which forms have been indicated. Thus, the features described and depicted herein/herewith are to be considered in all respects illustrative and not restrictive with the following brief description of the drawings and their content provided.

DETAILED DESCRIPTION OF THE INVENTION

Figure 1:
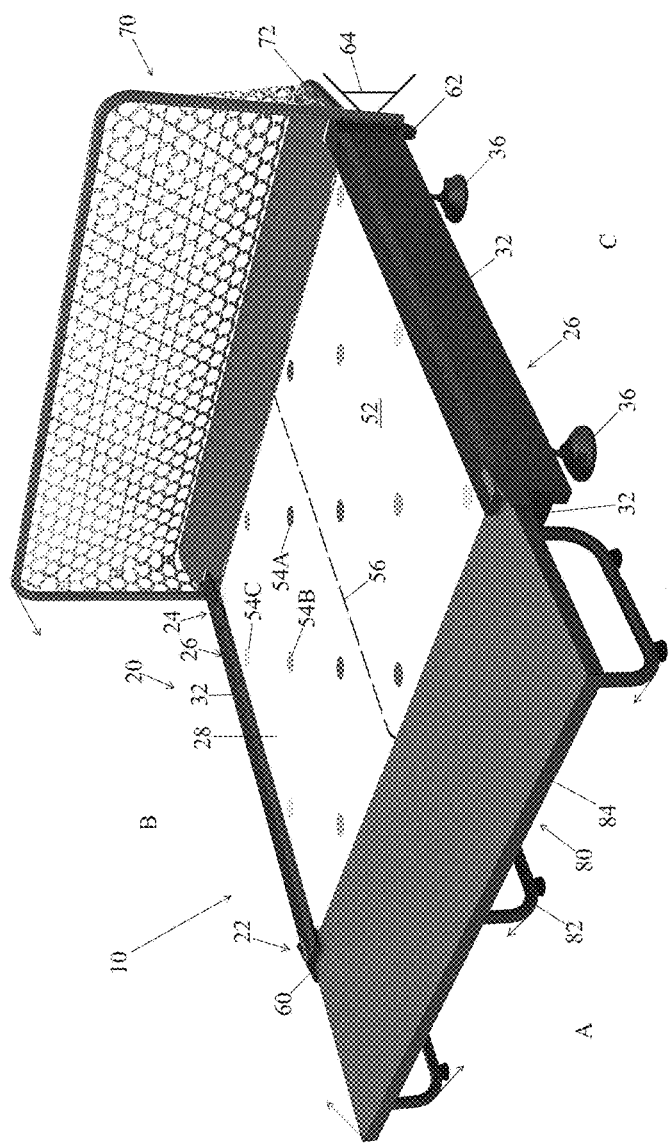
FIG. 1 is a perspective first corner view, slightly from above, of a non-limiting training apparatus, a deck assembly thereof shown intermediate a user platform and upstanding structure.
Figure 2:
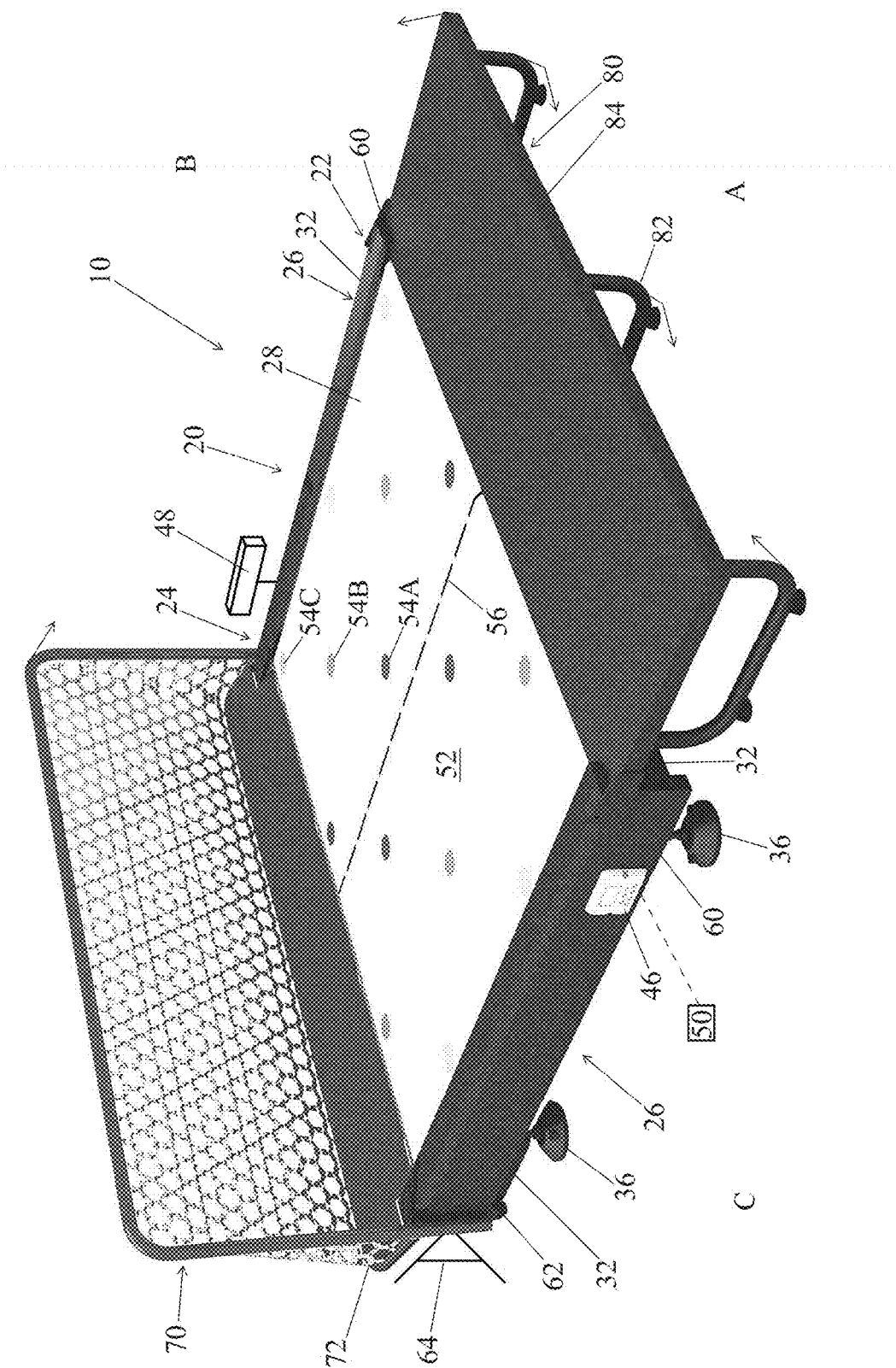
FIG. 2 is a perspective second corner view, slightly from above, of the non-limiting training apparatus of FIG. 1.

By way of introduction, a robust, illustrative, non-limiting training apparatus is generally shown in the alternate views of FIGS. 1 & 2. While features or elements such as a user platform and/or an upstanding structure (e.g., a "target") may be omitted or variably supplied in or for the training apparatus, a deck assembly, or at least components thereof and its or their function, is critical to the contemplated training apparatus. Moreover, an alternate or perhaps adapted apparatus, more particularly, a deck assembly thereof, may be optionally and readily equipped with curbing or the like, and/or sidewalls as is generally shown with reference to FIG. 4. Finally, representative non-limiting underlying apparatus particulars, more particularly, those in connection to the deck assembly, are provided in FIG. 3.

As a preliminary matter, while the instant training apparatus has origins in an adapted treadmill exercising device, it is not and need not be so limited. As a matter of fact, and generally contrary to treadmill devices, the deck of Applicant's contemplated deck assembly is not intended to support a user or users, but instead, only a work piece, such as, but not limited to, a puck, a ball, etc. Moreover, while the apparatus discussion proceeds with reference to, among other things a user platform and a "target," it will become apparent that while advantageous, neither feature or element is believed essential, and as to the former, its adjacency in relation to the deck assembly may be varied or variable.

In-as-much as the figures depict or represent an apparatus dimensioned, configured and/or arranged for individual and/or "home"/residential or modular use, including adaptation(s) to aid easy relocation, transport and/or storage, the subject disclosure is not so limited. For instance, and without limitation, the depicted apparatus may be readily adapted and/or scaled for multiple simultaneous users, with such apparatus contemplated and believed advantageous for a commercial use/installation at, for example, a rink, training center, school, etc. Be that as it may and notionally, the contemplated endless belt and its attendant electro mechanical drive assembly of the instant deck assembly are conventional and believed well known to those of skill in such art as evidenced by the forty-odd year old work of Townsend (U.S. Pat. No. 3,731,917), and the current work of Kramer et al. (U.S. Pat. No. 8,944,967), each incorporated herein by reference in their entireties.

With general reference now to FIGS. 1 & 2, there is generally shown a representative, non-limiting training apparatus 10. The apparatus essentially includes a "tool" (e.g., a stick) handling deck or deck assembly 20, and further advantageously includes an upstanding end wall structure 70, colloquially a "target," e.g., a target stylized as a hockey net/goal mouth as is generally shown, and a user platform 80. The stick handling deck assembly 20 is advantageously but not necessarily intermediate of the user platform 80, more particularly, adjacent an ingress deck portion 22, and the target 70, more particularly, adjacent an egress deck portion 24 as shown. Be that as it may, user platform 80 may be suitably located to either side of deck assembly 20 (i.e., adjacent the target in lieu of opposite the target), or omitted, with a user positionable adjacent the deck assembly in any of user locals A, B, or C as indicated.

Figure 3:
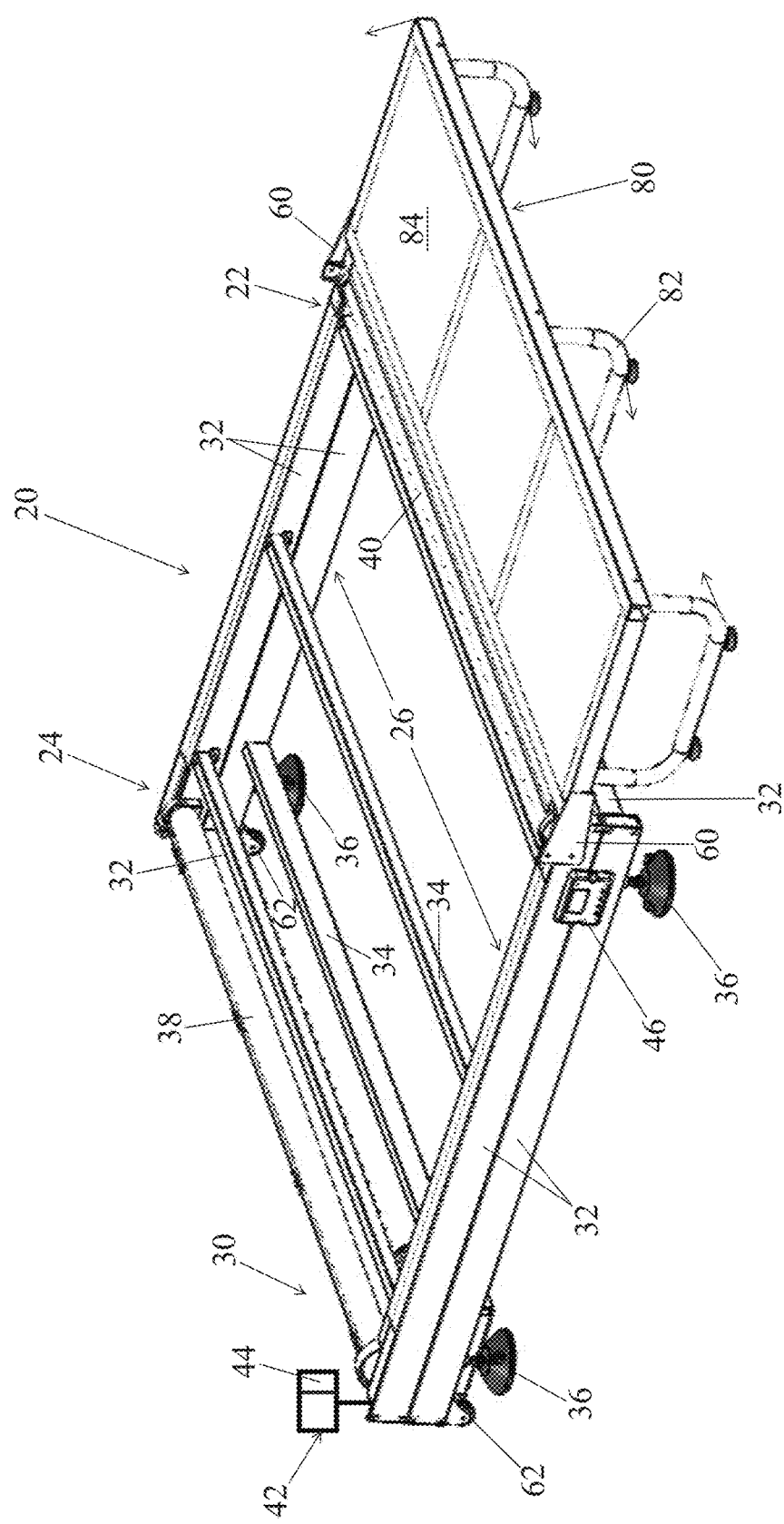
FIG. 3 depicts the apparatus of FIG. 2, assemblies, subassemblies and/or portions thereof removed to emphasize representative, non-limiting particulars associated therewith, namely, non-limiting particulars associated with the deck assembly thereof; and, FIG. 4 is a perspective first corner view, slightly from above, of a further non-limiting alternate training apparatus, namely, an apparatus including an adapted deck assembly.

With reference now to FIGS. 1-3, deck assembly 20 is generally characterized by a frame 26, an endless belt 28 interior of frame 26, and a belt drive assembly 30, elements or portions of which operatively support endless belt 28 for select travel in relation to frame 26. The frame 26 generally includes opposing sets of conventionally united periphery elements 32 (e.g., longitudinal and lateral) and traversing bracing members 34 as is generally shown. The frame 26 is readily adapted so as to carry levelers, for example as shown, select bracing members may be equipped with height adjustable "feet" 36 in furtherance of establishing a stable posture for the deck assembly specifically, and the apparatus generally. Beyond a bracing function, select bracing members further function in a support capacity, namely, select bracing members support a panel (not shown) about which the endless belt travels, more particularly, the panel underlies the emerging belt portion, i.e., the "upper" or visible belt portion so as to provide a less resilient/more rigid operating surface for a workpiece thereupon.

The belt drive assembly 30 is conventional in its form and function, and is generally but not necessarily characterized by a driven roller 38, a guide or passive roller 40, and an electro mechanical assembly 42 for selectively driving driven roller 38. Both the direction of belt travel in relation to the frame of the deck assembly (i.e., toward or away from the target) and the rate of belt travel with respect to same are user select, with travel rate being optionally programmable with suitable adaptation of an apparatus controller. The endless belt 28 is operatively supported in tension about rollers 38, 40 which in turn are operatively supported for rotation by frame portions or adapted frame portions of the deck assembly. The driven roller 38 may be driven directly or indirectly by a variable speed motor 44 of electro mechanical assembly 42.

An apparatus control module 46, supported for example upon a portion of frame 26 of deck assembly 20 as shown (FIG. 2), is generally provided, as is an associated user interface therefore. The interface may alternately or further include a remote apparatus controller, e.g., a wireless controller or a portable device/smart phone app or the like.

Operational functions such as, but hardly limited to remote on/off actuation, variable speed operation, bi-directional (i.e., forward/reverse) operation, time regulated operation, etc. are contemplated. Moreover, further sensing, detecting, controlling is contemplated and readily achievable with regard to motor/deck operations as a function of the relationship between, for, and/or among the belt indicia and work piece and/or work piece and target. Further still, timers, talliers, audio/visual signals, data recorders, etc. may be readily incorporated and controlled as warranted or desired, with such an information display and/or data recorder 48 (FIG. 2) operatively linked to control module 46, e.g., via a variety of assembly related sensors, detectors, monitors, etc. Finally, apparatus operation may be predicated or contingent upon receipt of payment via associated means for making such payment, much akin to arcade style gaming or the like. Notionally, coins, tokens, bills, debit, credit, etc. may be received by a conventional device or system 50 for receiving and processing same which is operatively linked/linkable to control module 46 to initiate and sustain apparatus operation for a select time or the like.

Figure 4:
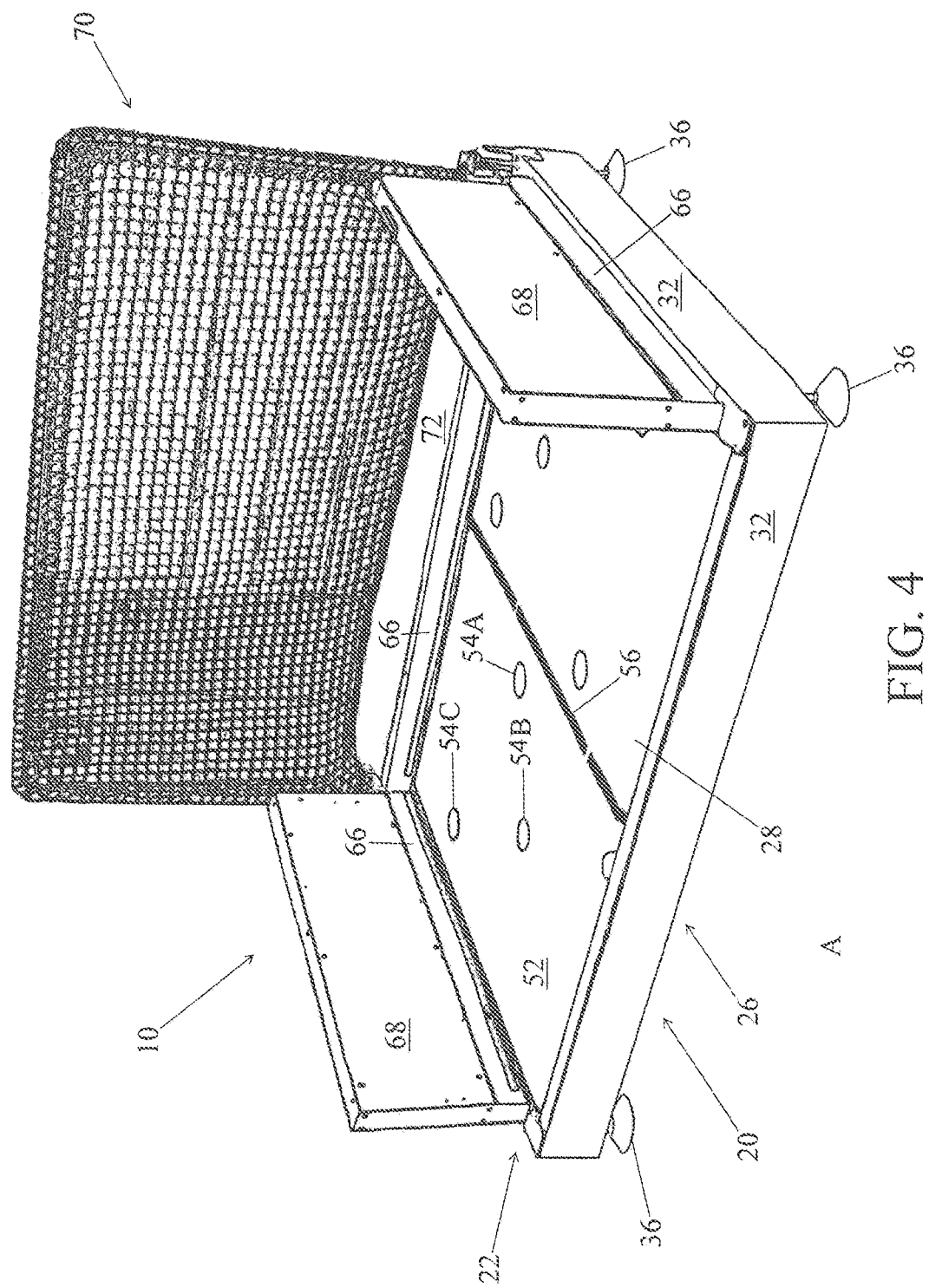

With reference now to FIGS. 1, 2 & 4, endless belt 28 includes a user visible surface 52 bearing indicia 54 about which a work piece is to be maneuvered or traversed by a user, advantageously but not exclusively a platform supported user, during travel of endless belt 28 in relation to frame 26. Notionally, "obstacles," represented as indicia upon the visible surface of the belt, are selectively presented to a stick wielding user positioned upon the platform in a readied state, a work piece supportable or supported by the belt and engageable or engaged by the user via the stick blade of the stick. Advantageously, but not exclusively, the elevational relationship between the platform supported user and the deck surface (i.e., belt) is similar to that of a skated player upon an ice surface. The deck is not intended to support a user.

Without limitation, indicia 54 may be user placed (i.e., selectively user located) or preselected and/or integral to the belt surface. Moreover, coded indicia may be provided correlating to degrees of required skill (e.g., beginner, intermediate, expert). Advantageously, but not necessarily, the indicia comprises indicia sets (e.g., 54a, 54b, & 54c as shown), each set of indicia characterized by select unique indicia spacings throughout a length and width of the endless belt as will be later detailed. Further still, sensing or detecting indicia may be part-and-parcel of the deck/deck assembly, or the apparatus controller, such that the belt is selectively driven upon a detection or non-detection sequence with regard to the work piece and indicia, i.e., upon not clearing a select number of indicia with the work piece, the belt slows or stops; contrariwise, upon clearing a select number of indicia with the work piece, the belt speed increases. Moreover, while a low friction work piece surface is believed desirable and advantageous, it need not be so limited.

With regard to the visible surface of the endless belt, namely, the markings thereof, several comments are warranted. As a preliminary matter, and solely for the sake of representative scale and the subsequent marking comments, the belt or operable deck surface associated with the depicted apparatus of FIGS. 1 & 2 and the deck assembly of FIG. 3 measures approximately 72 inches wide by 60 inches long (deep). Moreover, with circular indicia as shown, diameters thereof may suitably be within a dimension range of about 2-3 inches, however, alternately configured indicia, e.g., rectangular or other geometric forms, are likewise contemplated.

First, a centerline reference point is advantageously but not necessarily provided, more particularly, a centerline stripe 56 as shown, extending so as to be substantially parallel to the lateral edges of the belt, the centerline essentially delimiting two 36 inch wide belt portions, namely, left and right hand belt portions.

Second, a preferred, non-limiting indicia configuration includes unique spacing for three sets of indicia relative to benchmark centerline 56. A first set of indicia or markings (e.g., red (e.g., 54a)) are set at about 6 inches to the left and right of centerline 56 and 24 inches from each other. A second set of indicia or markings (e.g., black (e.g., 54b)) are set at about 18 inches to the left and right of centerline 56 and 24 inches from each other, this set being 12 inches fore/aft relative to the first set. Finally, a third set of indicia or markings (e.g., green (e.g., 54c)) are set at about 30 inches to the left and right of centerline 56 and 24 inches from each other, this set being spaced fore/aft as the first set.

With reference now to FIGS. 1, 2 & 4, upstanding structure 70 is advantageously, but not necessarily, styled as shooting target, namely, a goal/net. The target 70 is generally supported in an upstanding condition at or about egress or distal portion 24 of deck assembly 20. Advantageously, but not necessarily, a target base 72 is provided, and configured and/or oriented to aid the return of the work piece to the user via the deck of the deck assembly, e.g., via a target base surface (i.e., work piece receiving surface) sloped toward the deck. Alternately, either or both of the target and the platform may include work piece reservoirs, e.g., a tray, tub, etc. (not shown), for the retention of a supply of work pieces.

With renewed reference to FIGS. 1-3, user platform 80 is advantageously provided to support a user in any variety of postures, for example and without limitation, standing or sliding. The platform 80 generally spans the width of deck assembly 20 when so located, however it need not. Likewise, a depth of about 24 inches is believed advantageous for such structure. As is generally shown, spaced apart platform supports, e.g., legs 82 as shown, are provided to maintain a deck 84 of platform 80 in an elevated condition. In keeping with a modular intent, legs 82 may be reversibly secured to deck 84 of platform 80; contrariwise, it is contemplated that legs 82 be foldable, in lieu of being removable, so as to tuck under deck 84 of platform 80. Finally, deck height adjustability is believed advantageous, with the user platform so adapted or adaptable as is generally known/knowable.

Preferably, but not necessarily, either or both deck interfaces (i.e., ingress/egress end portions) may be characterized by a hinge or other linkage/interface 60 which permits collapse, folding, and/or disassociation of either or both of the target/platform to facility apparatus transport, relocation and/or storage. Moreover, a subassembly or portion of the apparatus may be readily adapted to includes wheels, rollers, sliders, etc., e.g., a rear underside portion of frame 26 of a deck assembly 20 advantageously includes wheels 62 to facilitate transport and/or relocation. Further still, frame 26 may be readily adapted to carry a stand or stand like element 64 in furtherance of enabling a "upright" folded storage of or for the apparatus.

With final reference now to FIG. 4, a modified deck assembly is shown and emphasized, namely, a deck assembly characterized by curbs 66 and sidewalls 68. As to the former, each upwardly extend from portions of frame 26 of deck assembly 20 as discrete elements, or contrariwise, curbs 66 may be integral to frame 26 so as to rise above the deck. In addition to a general framing and boundary function, the goal mouth curb may support/anchor training devices such as a work piece blocking board or a forward extending stick simulating that of a defender. As to the latter, each upwardly extend from the lateral curbs as discrete elements, or contrariwise, sidewalls 68 may subsume curbs 66 and be integral to frame 26 so as to substantially rise above the deck. Notionally, and in keeping with a modular approach, the sidewalls are advantageously discrete elements which are reversibly affixable, supportable or anchorable, at least indirectly, to the frame of the deck assembly.

Since the structures of the assemblies, subassemblies, and/or mechanisms disclosed herein may be embodied in other specific forms without departing from the spirit or general characteristics thereof, some of which forms have been indicated, the embodiments described and depicted herein/with are to be considered in all respects illustrative and not restrictive. Moreover, while nominal processing has be described and detailed, and to some degree alternate work pieces and systems, assemblies, etc. with regard thereto referenced, contemplated processes are not so limited. Accordingly, the scope of the subject invention is as defined in the language of the appended claims, and includes not insubstantial equivalents thereto.

What is claimed is:

1. Training apparatus comprising
   a. a user platform for support of a user in furtherance of select manipulation of a workpiece; and,
   b. a deck assembly adjacent said user platform, said deck assembly characterized by a frame, an endless belt interior of said frame, and a drive assembly, portions of which operatively support said endless belt for select travel in relation to said frame, said endless belt having a user visible surface bearing indicia about which the work piece is to be traversed by a platform supported user during travel of said endless belt in relation to said frame, said drive assembly including a controller for control of either or both of said endless belt travel direction in relation to said frame and said endless belt travel rate in relation to said frame.

2. The training apparatus of claim 1 wherein said indicia comprises indicia sets.

3. The training apparatus of claim 2 wherein each set of said indicia sets are characterized by select unique indicia spacings throughout a length and width of said endless belt.

4. The training apparatus of claim 1 wherein said indicia comprises multiple indicia sets, each set of said multiple indicia sets correlating to a unique degree of difficulty for work piece manipulation relative to said endless belt.

5. The training apparatus of claim 1 wherein said indicia comprise circular forms.

6. The training apparatus of claim 1 wherein said indicia comprise rectangular forms.

7. The training apparatus of claim 1 wherein said indicia comprise rectangular forms having a length angularly oriented in relation to a width of said endless belt.

8. The training apparatus of claim 1 wherein said apparatus further includes a target, said target adjacent an end of said deck assembly.

9. The training apparatus of claim 1 wherein said apparatus further includes a target, said target hingedly united to an end of said frame of said deck assembly.

10. The training apparatus of claim 1 wherein said user platform is adjacent an end of said deck assembly.

11. The training apparatus of claim 1 wherein said user platform is adjacent a side of said deck assembly.

12. The training apparatus of claim 1 wherein said user platform is hingedly united to an end of said frame of said deck assembly.

13. The training apparatus of claim 1 wherein said user platform is reversibly linked to an end portion of said frame of said deck assembly.

14. The training apparatus of claim 1 wherein said user platform includes depending legs to aid user support upon said user platform.

15. The training apparatus of claim 1 wherein said deck assembly further includes sidewalls, said sidewalls reversibly supportable by portions of said frame so as to extend therealong in a direction of travel of said endless belt.

16. The training apparatus of claim 1 wherein said frame includes weight bearing wheels at an end portion thereof.

17. The training apparatus of claim 1 wherein said frame includes sets of opposing paired levelers in furtherance of select leveling said deck assembly.

18. The training apparatus of claim 1 wherein said frame includes an end portion adapted to include stand elements in furtherance of vertically orienting the apparatus for storage.

19. The training apparatus of claim 1 wherein said controller is operatively linked to a payment interface whereby limited operative access to the apparatus may be obtained.

20. The training apparatus of claim 1 wherein said apparatus further includes a user interface for either or both of display or recording of performance related parameters.

21. A training apparatus comprising:
   a. a user platform for support of a user in furtherance of select manipulation of a workpiece;
   b. an upstanding structure opposite said user platform towards which the workpiece may be directed; and,
   c. a deck assembly intermediate said user platform and said upstanding structure, said deck assembly characterized by a frame, an endless belt interior of said frame, deployable sidewalls supportable by opposing portions of said frame, and a drive assembly, portions of which operatively support said endless belt for select travel relative to said frame and in a direction perpendicular to said user platform, said endless belt having a user visible surface bearing indicia about which the work piece is to be traversed by a platform supported user during travel of said endless belt in relation to said frame, said drive assembly including a controller for control of either or both of said endless belt travel direction relative to said frame and said endless belt travel rate in relation to said frame, each of said user platform and said upstanding structure configured for pivoted stowage in relation to said deck assembly.

22. A training apparatus comprising a deck assembly characterized by a frame, an endless belt interior of said frame, and a drive assembly, portions of which operatively support said endless belt for select travel relative to said frame, said endless belt for solely supporting a work piece thereupon, said endless belt having a user visible surface bearing indicia about which the supported work piece is to be traversed by a user positioned adjacent said frame during travel of said endless belt in relation to said frame, said drive assembly including a controller for control of either or both of said endless belt travel direction relative to said frame and said endless belt travel rate in relation to said frame.

\* \* \* \* \*